(12) United States Patent
Mathes et al.

(10) Patent No.: US 8,016,512 B2
(45) Date of Patent: Sep. 13, 2011

(54) DEVICE FOR FIXING A VACUUM PUMP

(75) Inventors: Rainer Mathes, St. Julien en Genevois (FR); Olivier Dauvillier, Marcellaz-Albanais (FR); Eric Dulac, Annecy (FR); André Bouille, Annecy (FR); Christian Savry, Annecy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/525,705

(22) PCT Filed: Aug. 27, 2003

(86) PCT No.: PCT/FR03/02586
§ 371 (c)(1),
(2), (4) Date: Feb. 24, 2005

(87) PCT Pub. No.: WO2004/020839
PCT Pub. Date: Mar. 11, 2004

(65) Prior Publication Data
US 2005/0244219 A1 Nov. 3, 2005

(30) Foreign Application Priority Data
Aug. 29, 2002 (FR) .................... 02 10713

(51) Int. Cl.
*F16B 5/00* (2006.01)
(52) U.S. Cl. ........ 403/335; 403/199; 403/262; 403/336; 403/337
(58) Field of Classification Search .................. 403/199, 403/262, 335–337, DIG. 3, 183, 261; 285/368; 415/90, 9; 411/542, 369, 371.1, 999; 277/630, 644, 637

See application file for complete search history.

(56) References Cited

U.S. PATENT DOCUMENTS

| | | | | |
|---|---|---|---|---|
| 1,831,430 A | * | 11/1931 | Weis | |
| 2,083,054 A | * | 6/1937 | Cline | 403/DIG. 3 |
| 2,560,413 A | * | 7/1951 | Carlson | 403/337 |
| 2,695,184 A | * | 11/1954 | Hobbs | 285/368 |
| 2,748,578 A | * | 6/1956 | Potts | 403/83 |
| 2,761,484 A | * | 9/1956 | Sternick et al. | 411/999 |
| 3,404,903 A | * | 10/1968 | Frantz | |
| 3,847,041 A | * | 11/1974 | Meschonat et al. | 81/57.38 |
| 4,127,142 A | * | 11/1978 | Snider | |

(Continued)

FOREIGN PATENT DOCUMENTS

EP         272642 A2 *  6/1988
(Continued)

OTHER PUBLICATIONS

International Search Report for PCT/FR03/02586.

*Primary Examiner* — Victor MacArthur
(74) *Attorney, Agent, or Firm* — Sughrue Mion, PLLC (57) ABSTRACT

A fastener system with a coaxial annular flange (14) having through holes (16), each serving to pass a screw (17) for screwing into an associated tapped hole (16) in the wall (2) of a stationary structure. Each through hole (16) has a circularly cylindrical distal segment (16a) followed by an enlarged proximal segment (16b) adjacent to the wall (2) of the stationary structure, allowing the shank (19) of the screw to bend and enabling a corresponding lateral offset (D). This prevents the screw (17) rupturing under high shear forces due to accidental destruction of a vacuum pump rotor while rotating at full speed.

16 Claims, 5 Drawing Sheets

U.S. PATENT DOCUMENTS

| | | | | |
|---|---|---|---|---|
| 4,541,817 A | * | 9/1985 | Sawabe et al. | 403/337 |
| 4,952,107 A | * | 8/1990 | Dupree | |
| 5,020,951 A | * | 6/1991 | Smith | 411/999 |
| 5,094,579 A | * | 3/1992 | Johnson | 411/999 |
| 5,203,066 A | * | 4/1993 | McDonald | |
| 5,203,441 A | * | 4/1993 | Monette | 403/337 |
| 5,220,854 A | * | 6/1993 | Allart et al. | 403/337 |
| 5,651,629 A | * | 7/1997 | Wall et al. | 403/337 |
| 5,687,537 A | * | 11/1997 | Noble | 403/337 |
| 5,771,266 A | * | 6/1998 | Fabris | 403/260 |
| 5,871,319 A | * | 2/1999 | Schneider | 411/999 |
| 6,176,663 B1 | * | 1/2001 | Nguyen et al. | 411/368 |
| 6,280,132 B1 | * | 8/2001 | Szczukowski et al. | 411/353 |
| 6,705,830 B2 | * | 3/2004 | Yamashita et al. | 415/9 |
| 6,824,349 B2 | * | 11/2004 | Okudera et al. | 415/90 |
| 2003/0095863 A1 | * | 5/2003 | Okudera et al. | 415/90 |

FOREIGN PATENT DOCUMENTS

JP    08 114196 A    5/1996

* cited by examiner

DEVICE FOR FIXING A VACUUM PUMP

TECHNICAL FIELD OF THE INVENTION

The present invention relates to vacuum pumps having a high speed of rotation that are secured and connected to a stationary structure such as a vacuum enclosure or a pipe for generating a high vacuum.

In the electronic or micromechanical components industry, methods of machining or plasma treatment are used that are performed in an enclosure where it is necessary to maintain a controlled vacuum atmosphere.

Generating a vacuum requires pumps to be used that are capable of generating a high vacuum quickly and of maintaining it, which pumps should be adapted to the method of machining or treatment. In general, the pumps are used are of the turbomolecular type, comprising a pump body in which a rotor is driven to rotate at high speed, e.g. at more than 30,000 revolutions per minute (rpm).

With such a high speed of rotation, the rotor acquires a very high level of kinetic energy.

The pump body has a suction orifice on its axis, which orifice is connected to an outlet orifice from the stationary structure, such as the vacuum enclosure or pipe. In general, the pump is secured solely to the stationary structure such as the vacuum enclosure or pipe, and it is supported solely by the zone surrounding the suction orifice of the pipe and the corresponding orifice of the stationary structure. Thus, the pump body has an annular flange coaxially surrounding the suction orifice, with tapped holes being provided in the wall of the stationary structure around its outlet orifice, and through holes being provided in the coaxial annular flange of the pump body, so that headed screws can be engaged with their shanks passing through the through holes in the flange and being screwed into the associated tapped holes in the stationary structure in order to secure the vacuum pump to the stationary structure by pressing the flange against the wall of the stationary structure.

In traditional manner, the shanks of the screws are circular cylinders each having a smooth segment passing through a through hole of diameter slightly greater than the diameter of the shank, and an end segment that is threaded so as to screw into an associated tapped hole.

Standards lay down respective dimensions for the flange, the screws, and the necessary holes, and also for the number of screws and holes, depending on the diameters of the pumps.

Thus, for a turbomolecular pump of the ATHM type from the supplier Alcatel, the pump is fastened by providing a flange of DN 250 iso-F type with twelve screws of M10 type each having a shank with a length of about 30 millimeters (mm) and a diameter of 10 mm, and the holes in the flange and the stationary structure have a nominal diameter of 11 mm.

Such a fastener structure gives full satisfaction under normal conditions of use, thus making it possible to withstand the mechanical forces generated by operation of the vacuum pump during normal use.

However, it has been found that an insurmountable difficulty can arise in the event of the rotor of the pump being accidentally destroyed while rotating at full speed. Under such circumstances, the rotor running at its full speed of rotation becomes unbalanced and can strike the wall of the pump body violently, thereby imparting a transverse or radial displacement thereto, and can rub strongly against the wall of the pump body, thereby imparting a coaxial rotary torque thereto. Because of the large amount of energy that is accumulated in the rotor when rotating at high speed, the mechanical stresses applied by the rotor to the pump body are very high and multidirectional, and these stresses are transmitted to the system for fastening the vacuum pump to the stationary structure. This results in violent multidirectional shear forces being applied to the fastener screws, and in present-day structures it can happen that these forces lead to total rupture of the screws. The pump then becomes detached from the stationary structure and constitutes a dangerous projectile that can hurtle through the premises in which the pump was being used.

The abstract of Japanese patent JP 08 114196 A teaches fastening a turbomolecular pump by a flange having screw-passing holes in register with through holes in a stationary part. Fastener screw pass through the screw-passing holes and through the through holes in order to receive clamping nuts. Each screw-passing hole includes an oblong segment that is offset laterally so as to allow the corresponding screw to bend unidirectionally in the event of abnormal axial twisting occurring. That disposition, which acts in one direction only and only in the event of abnormal torque, is not designed to withstand the multidirectional forces that appear during accidental destruction of the rotor, and under such circumstances it does not give satisfaction.

SUMMARY OF THE INVENTION

The invention seeks to devise a modification to the fastener structure for vacuum pumps which, while remaining compatible with the standards presently in force, also serves to increase capacity for retaining the vacuum pump on the stationary structure and avoids the fastener screws rupturing and the pump becoming detached in the event of the rotor bursting while rotating at full speed.

To do this, the invention takes advantage of the observation whereby the risk of the screws rupturing is reduced when the through holes in the flange in which the screws are received allow the shanks of the screws a certain amount of space for multidirectional deformation in bending.

Thus, to achieve this object, and others, the invention provides a fastener system for fastening a vacuum pump to a wall of a stationary structure, in which a coaxial annular flange is provided on the vacuum pump body around the suction orifice, tapped holes are provided in the wall of the stationary structure, through holes are provided in the coaxial annular flange, and screws having heads are fitted so that their shanks pass through the through holes and are screwed into the associated tapped holes in order to secure the vacuum pump to the stationary structure while pressing the flange against the wall of the stationary structure; according to the invention, each through hole comprises a distal segment that is circularly cylindrical followed by an enlarged proximal segment that is circularly cylindrical about the same axis and that is adjacent to the wall of the stationary structure, making it possible, in the event of shear forces being applied in any lateral direction in the connection zone between the vacuum pump and the stationary structure, for the shank of the screw to bend and for the through hole to be offset laterally correspondingly relative to the associated tapped hole.

In a preferred embodiment:
the proximal segment of the through hole is of a shape such that during bending of the screw shank until it comes into abutment against the side wall of the proximal segment of the through hole, the lateral offset that is possible between the through hole and the associated tapped hole is greater than the radius of the screw shank; and
the proximal segment of the through hole is of a length greater than the length of the distal segment of the through hole.

As a result, deformation of the screw shank is distributed better, thereby improving its ability to withstand rupture.

In practice, and advantageously, the proximal segment of the through hole includes a circularly cylindrical proximal portion that is connected to the distal segment of the through hole by a circularly frustoconical distal portion.

For example, the frustoconical distal portion may have a cone half-angle equal to about 60°, thereby facilitating manufacture, and in particular machining, of the through hole.

An improvement in ability to withstand rupture can also be obtained by ensuring that the screw shank comprises, adjacent to the head, a smooth shank segment of diameter that is considerably smaller than the diameter of the distal segment of the screw hole, and that is followed to a free end by a threaded segment shaped to screw into the associated tapped hole.

In practice, and advantageously, the diameter of the smooth segment of the shank may be selected to be less than or equal to 80% of the diameter of the distal segment of the through hole.

When the screw shank has a diameter that is considerably smaller than that of the hole, provision can advantageously be made for the proximal segment of the through hole to have a length that is greater than or equal to 1.5 times the length of the distal segment of the through hole.

Preferably, a washer is interposed between the head of the screw and the adjacent outside face of the flange.

A further improvement in the mechanical strength properties is also obtained by providing an elastomer type damper material which is inserted in the space between the screw shank and the corresponding through hole in the flange. Such a material dissipates, in the form of heat, a fraction of the energy coming from the destruction of the rotor, thereby correspondingly relieving the screw shank.

In another aspect, the invention provides a vacuum pump provided with a fastener flange having through holes in compliance with the system as defined above.

BRIEF DESCRIPTION OF THE DRAWINGS

Other objects, characteristics, and advantages of the present invention appear from the following description of particular embodiments, given with reference to the accompanying figures, in which.

DESCRIPTION OF PREFERRED EMBODIMENTS

Figure 1:
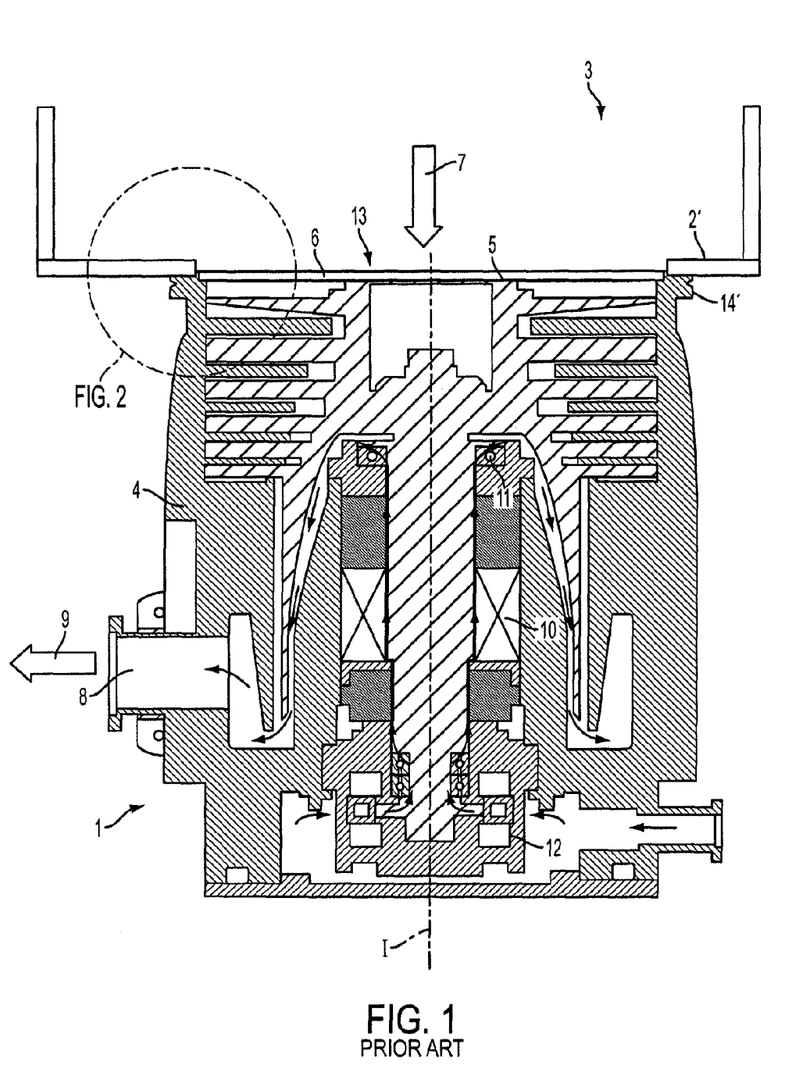
FIG. 1 is a diagrammatic longitudinal section view showing a turbomolecular pump structure and how it is fastened to a stationary structure such as a vacuum enclosure.

Reference is made initially to FIG. 1 showing the structure of a vacuum pump 1 of the turbomolecular type, secured to the wall 2' of a stationary structure 3 such as vacuum enclosure.

The turbomolecular vacuum pump 1 comprises a pump body 4 in which a rotor 5 rotates at high speed about an axis of rotation I. The pump body 4 has a suction orifice 6 on the axis, through which the pumped gas 7 penetrates, and an exhaust orifice 8 through which the outlet gas 9 is exhausted. The rotor 5 is rotated in the pump body 4 by an internal motor 10, and it is guided laterally by magnetic or mechanical bearings 11 and 12.

The wall 2' of the vacuum enclosure 3 has an outlet orifice 13 corresponding to the suction orifice 6 of the vacuum pump 1, and generally constitutes a closed enclosure that is isolated from the outside and in which the vacuum pump 1 can establish a controlled vacuum.

A coaxial annular flange 14' is provided on the vacuum pump body 4 around the suction orifice 6 in order to fasten the vacuum pump 1 to the wall 2' of the stationary structure 3 constituted by a vacuum enclosure. Thus, the vacuum pump 1 is fastened to the wall 1 of the stationary structure 3, such as the vacuum enclosure, around the periphery of the outlet orifice 13 and the suction orifice 6.

In compliance with the standards presently in force, tapped holes are provided in the wall 2' of the stationary structure 3, which holes are distributed around the outlet orifice 13, and through holes are provided in the coaxial flange 14', with headed screws being fitted so that their shanks pass through the through holes and are screwed into the associated tapped holes in order to secure the vacuum pump 1 to the stationary structure 3 by pressing the flange 14' against the wall 2' of the stationary structure 3.

Figure 2:
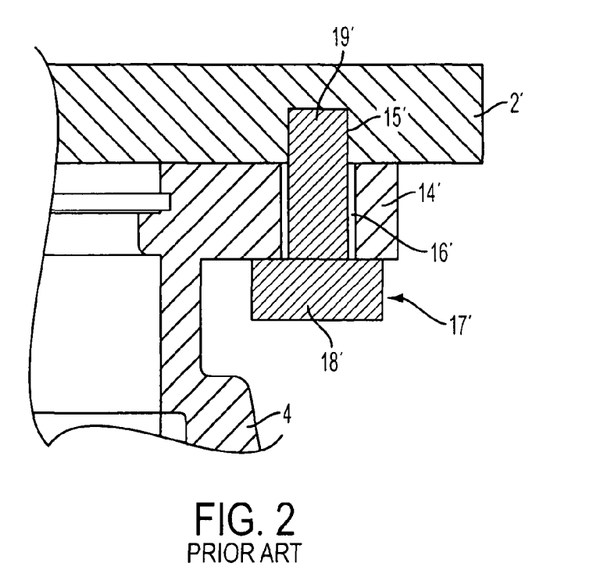
FIG. 2 is an enlarged view of detail A in FIG. 1, showing the prior art structure of the fastener means conventionally used for holding a turbomolecular pump.
Figure 3:
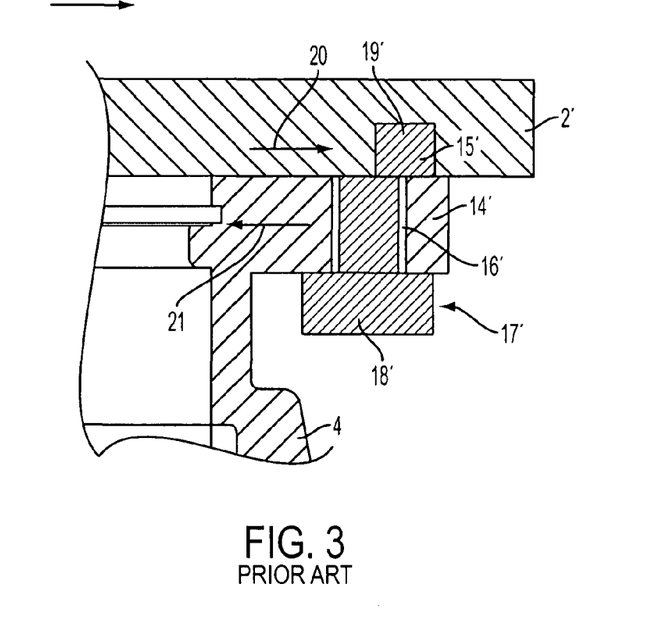
FIG. 3 shows the shear forces applied to the FIG. 2 fastener structure in the event of accidental destruction of the rotor while rotating at full speed.

FIGS. 2 and 3 show a prior art fastener system complying with the standards presently in force. This figure shows a fragment of the coaxial annular flange 14' forming part of the pump body 4, and the wall 2' of the stationary structure with a tapped hole 15'. The flange 14' has a circularly cylindrical through hole 16'. A screw 17' having a head 18' and a shank 19' is fitted so that its shank 19' passes through the through hole 16' in the flange 14' and is screwed into the tapped hole 15' in the wall 2'. The diameter of the shank 19' of the screw 17' is slightly smaller than the diameter of the through hole 16' in the flange 14' leaving no more than the usual functional clearance of about 0.5 mm between the shank 19' of the screw 17' and the wall of the through hole 16'.

FIG. 3 shows the same items identified by the same numerical references. In the event of the rotor being destroyed while rotating at full speed, the kinetic energy accumulated in the rotor is transmitted to the pump body 4 which tends to move laterally. This applies shear stresses to the screw shanks 19', as represented by arrows 20 and 21, which stresses can lead to a shank 19' rupturing as shown in FIG. 3. The invention seeks to avoid such rupture in order to guarantee that the vacuum pump 1 continues to remain secured to the wall 2' of the stationary structure 3, even in the event of its rotor being destroyed while rotating at full speed.

Figure 4:
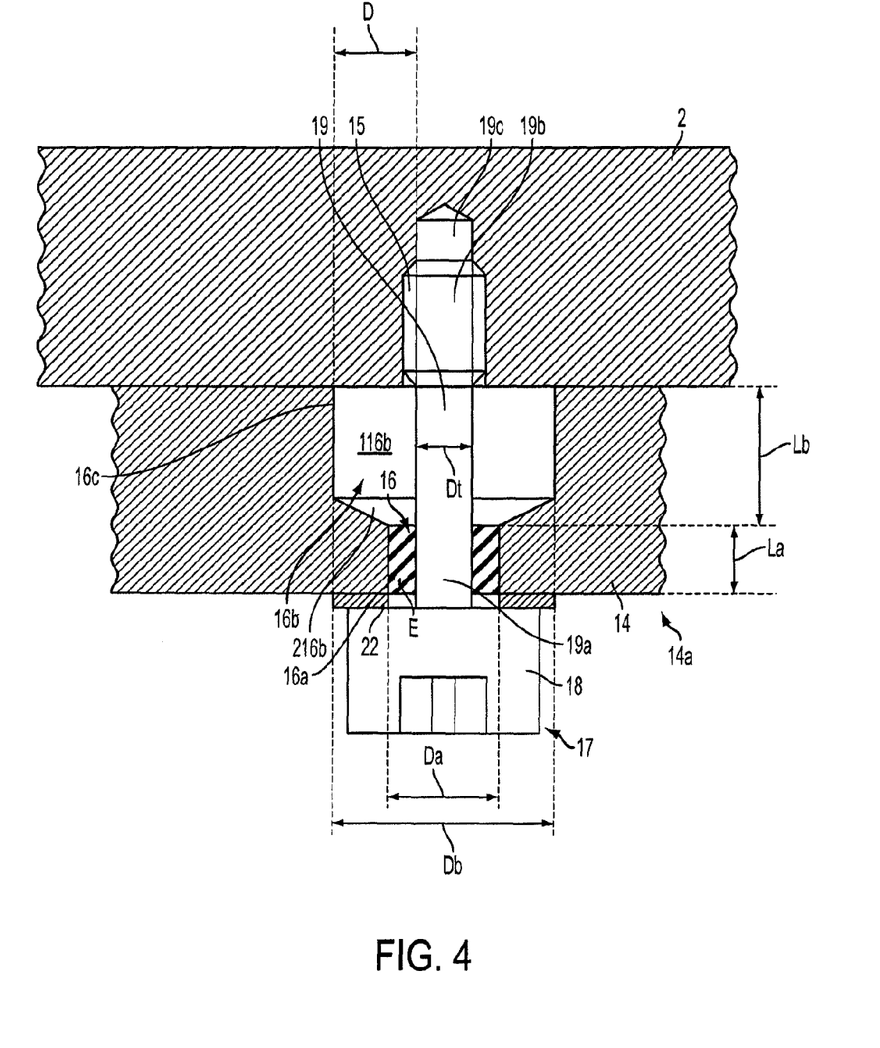
FIG. 4 is a diagrammatic section view of a modified fastener structure constituting an embodiment of the present invention.
Figure 5:
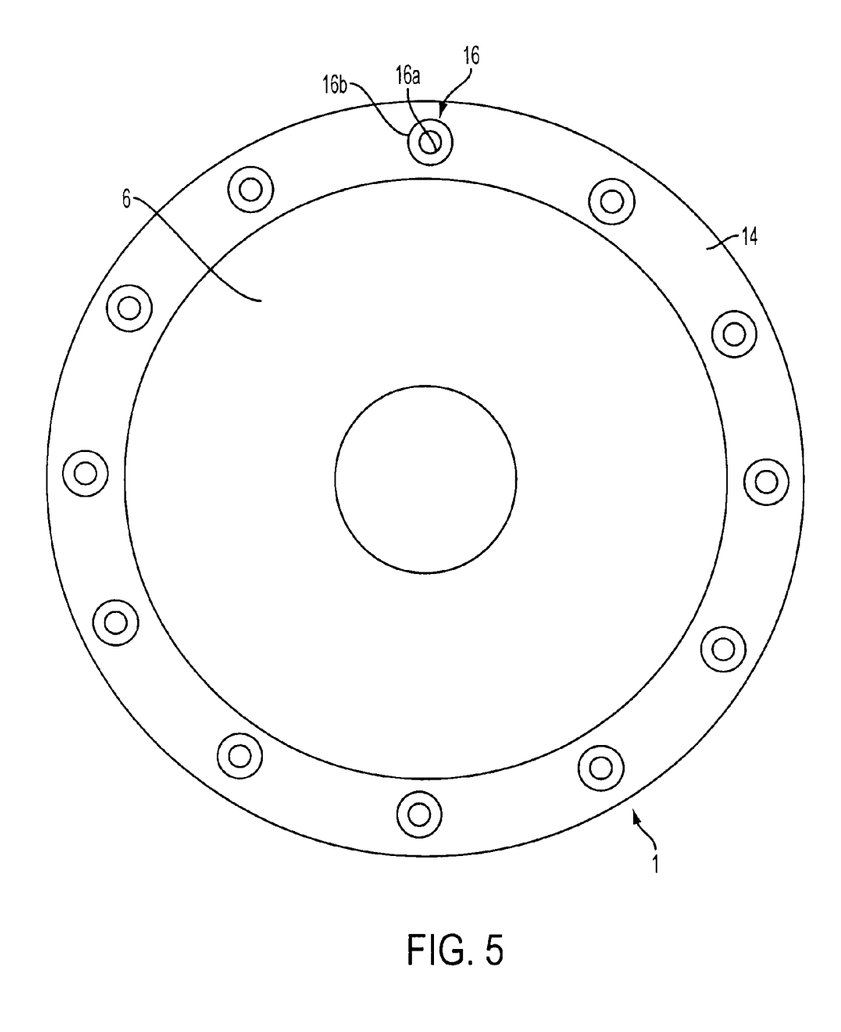
FIG. 5 is a plan view of the turbomolecular pump modified in accordance with the present invention, showing the annular flange and the fastener holes of modified shapes.
Figure 6:
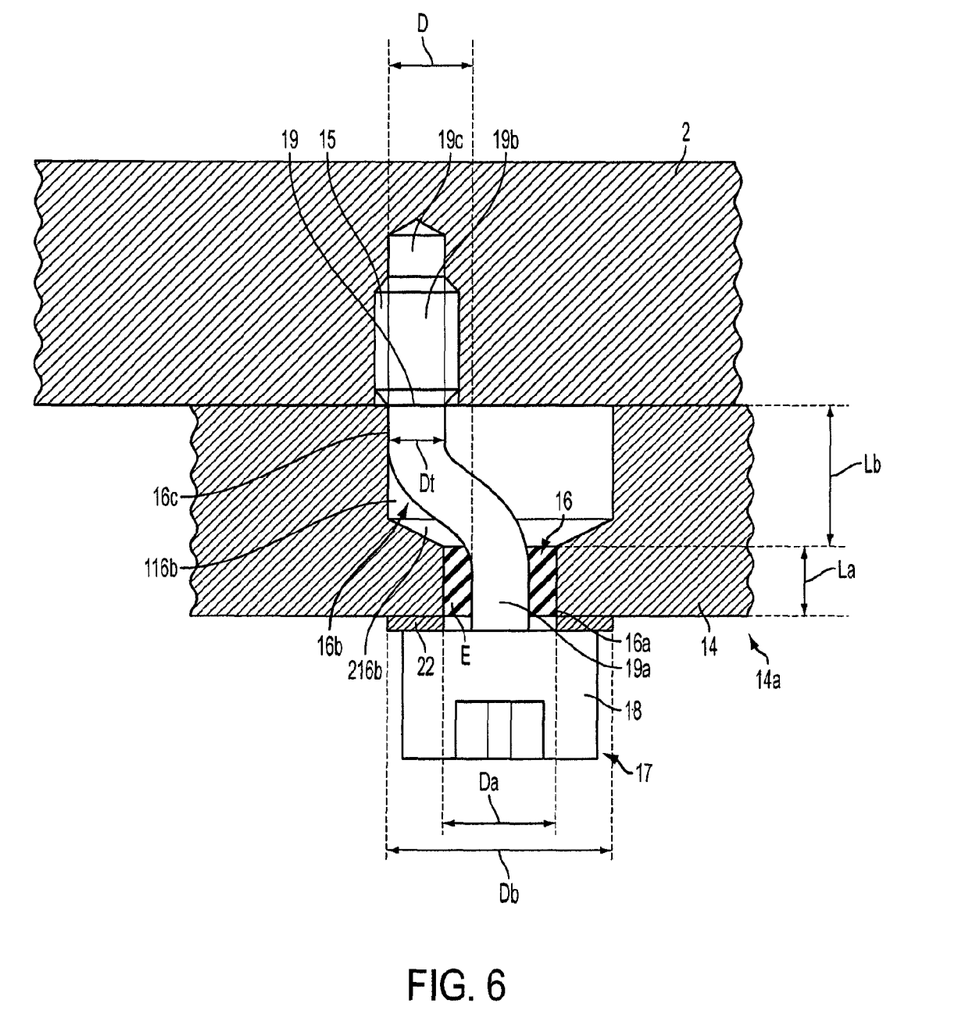
FIG. 6 is a diagrammatic section view of a modified fastener structure constituting an embodiment of the present invention.

The modifications provided for this purpose by the present invention are shown in FIGS. 4 and 5 which show a particularly advantageous embodiment.

In a vacuum pump fastener system of the invention, there is still the flange 14 on the pump body, of annular shape around the suction orifice 6, and for pressing against the wall 2 of a stationary structure such as vacuum enclosure. There are likewise through holes 16 in the flange 14 and tapped holes 15 in the wall 2, together with screws 17 having heads 18 and shanks 19.

Each through hole 16 comprises a circularly cylindrical distal segment 16a of diameter Da followed by an enlarged proximal segment 16b that is circularly cylindrical about the same axis, of diameter Db greater than Da, and adjacent to the wall 2 of the stationary structure. It will thus be understood that when shear stress tends to displace the pump body 4 in any direction relative to the wall 2 of the stationary structure, the presence of the enlarged proximal segment 16b leaves room in the connection zone between the vacuum pump 1 and the stationary structure 3 for the screw shank 19 to bend, leading to a corresponding lateral offset between the through hole 16 and the associated tapped hole 15. By bending in this way, the ability of the screw 17 to withstand rupture is significantly increased, regardless of the lateral direction in which the force is applied.

It will thus be understood that during such shear stress, the pump body 4 may move laterally until the shank 19 of the screw 17 comes into abutment against the side wall of the through hole 16 in its portion adjacent to the wall 2 of the stationary structure. For example, during displacement of the pump body 4 to the right in FIG. 4, the shank 19 of the screw 17 can bend until the shank 19 comes to bear against the left-hand face 16c of the side wall of the through hole 16. In other words, the pump 4 can move until the left-hand face 16c of the through hole 16 comes into the vicinity of the tapped hole 15 in the wall 2. This displacement is represented by arrow D in FIG. 4. This displacement D shows the amount of lateral offset that is possible between the through hole 16 and the associated tapped hole 15.

It will be understood that this possible lateral offset D depends on the shape of the proximal segment 16b of the through hole 16.

The shape of the proximal segment 16b is preferably such that during bending of the screw shank 19 until it comes into abutment against the side wall 16c of the proximal segment 16b, the lateral offset D is greater than the radius of the screw shank 19 (or half its diameter Dt). Simultaneously, the proximal segment 16b should advantageously be of a length Lb that is greater than the length La of the distal segment 16a. This ensures that it is possible for the screw shank 19 to deform over a long length of shank.

In the embodiment shown in FIG. 4, the proximal segment 16b comprises a proximal portion 116b of circularly cylindrical shape having diameter Db, which is connected to the distal segment 16a by a distal portion 216b of circularly frustoconical shape. The frustoconical distal portion 216b has a cone half-angle equal to about 60°.

In order to further increase the bending capacity of the screw shank 19, it is possible to provide a screw that is of special shape as shown diagrammatically in FIG. 4. Under such circumstances, the screw shank 19 comprises, adjacent to the head 18, a smooth shank segment 19a of diameter Dt that is considerably smaller than the diameter Da of the distal segment 16a of the through hole 16. The smooth shank segment 19a is extended to the free end 19c of the shank 19 by a threaded segment 19b shaped for being screwed into the associated tapped hole 15 of the wall 2. The diameter Dt of the smooth shank segment 19a is preferably less than or equal to 80% of the diameter Da of the distal segment 16a of the through hole 16. A diameter ratio lying in the range 70% to 80% can be suitable.

The proximal segment 16b of the through hole 16 is also of a length Lb that is greater than or equal to 1.5 times the length La of the distal segment 16a of the through hole 16.

A washer 22 may be interposed between the head 18 of the screw 17 and the adjacent outside face 14a of the flange 14.

In the embodiment shown in FIG. 5, the flange 14 has twelve through holes like the hole 16, each having two successive segments 16a and 16b on the same axis, the holes being regularly distributed in the annular flange 14 around the suction orifice 6 of the vacuum pump 1. In a vacuum pump 1 held by a flange 14 of the DN 250 type, in accordance with the standards presently in force, the number of through holes 16 complies with the standards in force.

Tests have shown that with a turbomolecular pump held by such a standardized 12-hole flange passing screws as shown in FIGS. 2 and 3, destruction of the rotor of the vacuum pump causes the screws 17 to rupture in shear. In contrast, with the modifications of the invention as shown in FIG. 4, tests have shown firstly that twelve screws engaged in twelve through holes 16 serve to hold the vacuum pump without the screws rupturing in the event of the rotor being destroyed. Furthermore, the same tests when performed with only nine screws have demonstrated that the modifications in accordance with the invention still enable the pump to be held without the nine screws rupturing in the event of a rotor running at full speed being destroyed.

It can thus be considered that the modifications provided by the invention make it possible to guarantee that the vacuum pump will be held to a stationary structure in the event of its rotor becoming destroyed while running at full speed, with a safety margin of at least 30%.

The system can be further improved by inserting an elastomer type damper material E in the space between the screw shank 19 and the corresponding through hole 16 in the flange 14.

Naturally the invention applies not only to vacuum pumps fastened by means of a 12-screw DN 250 flange, but also to vacuum pumps of other sizes fastened by other standardized flanges adapted to those sizes.

The present invention is not limited to the embodiments described explicitly, but it includes the variants and generalizations contained within the ambit of the following claims.

The invention claimed is:

1. A fastener system for fastening a vacuum pump (1) to a wall (2) of a stationary structure (3) having tapped holes (15) provided in the wall (2) of the stationary structure (3), said fastener system comprising:

an annular flange (14) configured to be provided on a body of the vacuum pump and around a suction orifice (6) such that the flange (14) is coaxial with respect to a center axis of the suction orifice (6);

through holes (16) provided in the annular flange (14); and screws (17) having heads (18), wherein the screws are fitted so that shanks (19) of the screws (17) pass through the through holes (16) and are to be screwed into corresponding ones of the tapped holes (15) in order to secure the vacuum pump (1) to the stationary structure (3) while pressing the flange (14) against the wall (2) of the stationary structure (3); and wherein each through hole (16) comprises a distal segment (16a) that is cylindrical about a first axis followed by an enlarged proximal segment (16b) that is cylindrical about the first axis;

wherein said shank passes through said distal segment first, and then passes through said proximal segment;

wherein the proximal segment is connected to the distal segment by a frustoconical distal portion; and wherein the shank of the screw bends inside the through hole and the proximal segment of each through hole is of a length greater than the length of the distal segment of each through hole, such that the through holes are configured to offset laterally in response to shear forces (20, 21) being applied in any lateral direction in a connection zone between the vacuum pump (1) and the stationary structure (3).

2. A system according to claim 1, wherein the proximal segment (16b) of the through holes (16) allows a maximum lateral offset (D) that is greater than the radius of the screw shank (19), such that during bending of the screw shank (19), the screw shank comes into abutment against the side wall (16*c*) of the proximal segment (16*b*) of the through hole (16).

3. A system according to claim 1, characterized in that the proximal segment (16*b*) of the through holes (16) includes a cylindrical proximal portion (116*b*) that is connected to the distal segment (16*a*) of the through holes (16) by the frustoconical distal portion (216*b*).

4. A system according to claim 3, characterized in that the frustoconical distal portion (216*b*) has a cone half-angle equal to about 60°.

5. A system according to claim 1, characterized in that the screw shank (19) comprises, adjacent to the head (18), a smooth shank segment (19*a*) of diameter (Dt) that is considerably smaller than the diameter (Da) of the distal segment (16*a*) of the through holes (16), and that is followed to a free end (19*c*) by a threaded segment (19*b*) shaped to screw into the associated tapped holes (15) in the wall (2).

6. A system according to claim 5, characterized in that the diameter (Dt) of the smooth shank segment (19*a*) is less than or equal to 80% of the diameter (Da) of the distal segment (16*a*) of the through holes (16).

7. A system according to claim 5, characterized in that the proximal segment (16*b*) of the through holes (16) is of a length (Lb) greater than or equal to 1.5 times the length (La) of the distal segment (16*a*) of the through holes (16).

8. A system according to claim 1, characterized in that a washer (22) is interposed between the head (18) of the screw (17) and an adjacent outside face (14*a*) of the flange (14).

9. A system according to claim 1, characterized in that an elastomer damper material is inserted in the space between the shank (19) of the screw and the corresponding through holes (16) of the flange (14).

10. A fastener system for fastening a vacuum pump, the fastener system comprising:
a screw comprising a head and a shank;
an annular flange comprising a through hole, wherein the through hole comprises a distal segment and a proximal segment; and
a stationary structure having a hole for receiving the screw; and
wherein a cross-sectional area of the distal segment taken in a direction perpendicular to a central axis of the through hole is smaller than a cross-sectional area of the proximal segment taken in a direction perpendicular to the central axis of the through hole, and such that, the screw is inserted into the through hole with the proximal segment closest to the stationary structure relative to the distal segment and secured to the stationary structure, the proximal segment provides a gap in which the shank bends while maintaining the flange fastened to the stationary structure;
wherein the proximal segment is connected to the distal segment by a frustoconical distal portion; and
wherein the proximal segment has an opening directly adjacent to the hole in the stationary structure that is sized differently from a portion of the hole in the stationary structure that is directly adjacent to the opening in the proximal segment.

11. The fastener system according to claim 10, wherein the opening of the proximal segment directly adjacent to the hole in the stationary structure is larger than the hole in the stationary structure.

12. The fastener system according to claim 10, wherein a distance measured in a radial direction of the through hole between an inside wall of the proximal segment and an opposing outside surface of the screw shank is greater than a radius of the screw shank.

13. The fastener system according to claim 10, wherein the proximal segment of the through hole is of a length greater than a total length of the distal segment of the through hole.

14. The fastener system according to claim 10, wherein the shank comprises, adjacent to the head, a smooth shank segment of a diameter that is substantially smaller than a diameter of the distal segment of the through hole, and that is followed to a free end by a threaded segment shaped to screw into the hole in the stationary structure.

15. The fastener system according to claim 14, wherein the diameter of the smooth shank segment is less than or equal to 80% of the diameter of the distal segment of the through hole.

16. The fastener system according to claim 14, wherein the proximal segment is of a length greater than or equal to 1.5 times a length of the distal segment.

\* \* \* \* \*